Oct. 22, 1940.  W. PLATT ET AL  2,218,550
PREPARED CITRUS FRUIT PEEL
Filed April 23, 1938
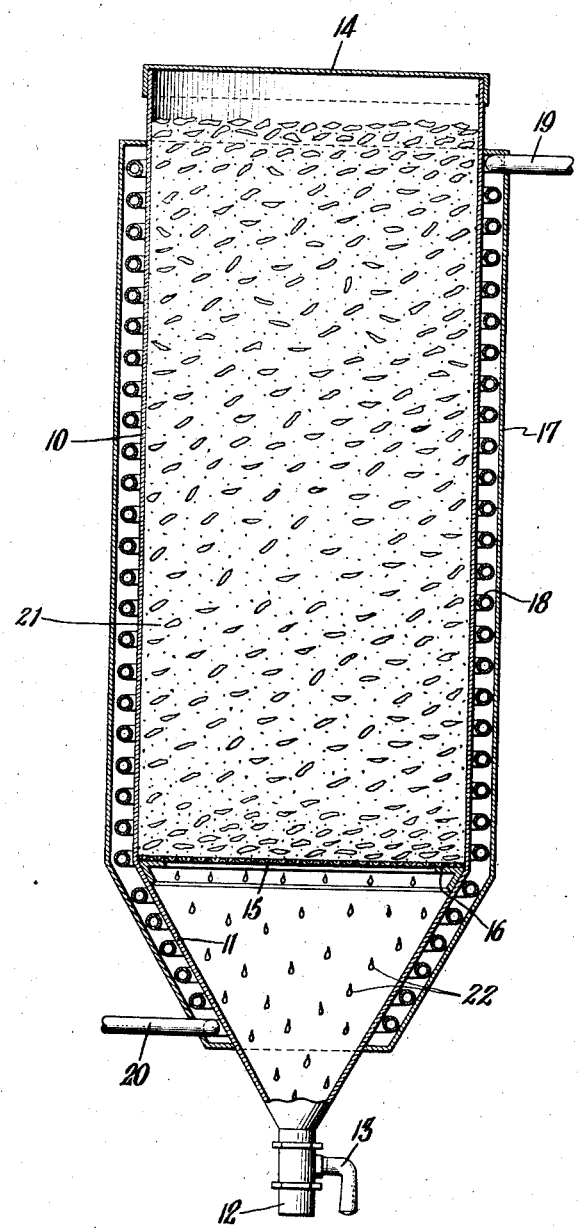
INVENTORS
Washington Platt.
Philip D. Kratz.
BY
W Philip Churchill
ATTORNEY Patented Oct. 22, 1940

2,218,550

UNITED STATES PATENT OFFICE 2,218,550

PREPARED CITRUS FRUIT PEEL

Washington Platt, Syracuse, and Philip D. Kratz, Lynbrook, N. Y., assignors to The Borden Company, New York, N. Y., a corporation of New Jersey Application April 23, 1938, Serial No. 203,749

6 Claims. (Cl. 99—102)

This invention relates to dried citrus fruit peel and the preparation thereof and more particularly to dried citrus fruit peel gratings in a form especially suitable for use as flavorings in pie fillings, icings, and the like.

Candied citrus fruit peels have been prepared heretofore in the form of large slices which have retained but little, if any, of the full natural flavor of the fruit. This has been due primarily to the loss of volatile constituents from the peel or the oxidation thereof during treatment of the peel, which has involved boiling the peel in water and/or drying the peel in the open air prior to coating with sugar. The essential oils found in citrus fruit peel are very volatile and consequently have been driven off when the gratings are dried or boiled in water. In fact, at least 95% of the original essential oil in the peel may be quickly lost in this manner.

It is an object of our invention to prepare dried citrus fruit gratings while conserving the essential oils, thereby retaining the natural flavor of the peel.

It is also an object of this invention to provide candied citrus fruit peel gratings which are finely divided and suitable for use as a flavoring and which contain at least 10%, and preferably more than 25%, of the essential oils originally contained in the peel.

One form of apparatus suitable for use in connection with this invention is shown in vertical section in the figure of the accompanying drawing.

By way of illustrating this invention, the preparation of candied lemon peel gratings will be described, although it is to be understood that the gratings of other citrus fruit peels, such as oranges, grapefruit, etc. may be prepared in a similar manner.

Our process involves the heating of the citrus fruit gratings while coated with a material having an affinity for water, such as ordinary cane sugar, in a closed space, and allowing the syrup formed by the water in the peel gratings and sugar to be drained away from the gratings. If desired, the syrup formed may be removed from the closed space in which heating is carried out during the treating of the gratings. An apparatus such as shown in the drawing may be used for this purpose, although many variations of this apparatus useful for purposes of practicing the invention will be apparent to those skilled in the art.

In the drawing, numeral 10 indicates a cylindrical receptacle provided with a funnel-shaped lower portion 11. At the bottom of the portion 11, an outlet pipe 12 is provided which is normally closed by the valve 13. At its top, this receptacle 10 may be closed by a tight fitting cover 14. If desired, the cover 14 may be clamped in place or provided with a special seal to prevent escape of vapors from the receptacle. Near the upper part of the funnel-shaped portion 11 of the receptacle 10, a perforated false bottom, such as a woven wire screen 15 having openings about $\frac{1}{16}$ inch in diameter may be provided supported by the flanged member 16 which rests on the inclined inner surface of the funnel-shaped portion 11. Surrounding substantially the entire receptacle is a jacket 17 enclosing a pipe coil 18. Steam, hot water or other heating medium, or a cooling medium may be introduced into the coil 18 through the inlet 19 and withdrawn through the outlet 20. If desired, the coil 18 may be omitted and the jacket 17 itself filled with a heating or cooling medium.

In the operation of our process, the citrus fruit, such as lemons, may be subjected to a conventional grating operation to remove the peel in small pieces, preferably without puncturing the fruit and allowing the juice to be extracted. The gratings should be obtained from the flavedo of the fruit including as little of the albedo as practical. The peeled fruit may thus be used for other purposes where the fruit juice or fruit pulp is required. Average lemon peel contains normally about 4% of essential oils and about 75% moisture. The grated peelings are thoroughly mixed with powdered sucrose in the proportions of about 1 part gratings to 2 to 4 parts sucrose, by weight. We preferably employ about 3 parts sugar to 1 part gratings. This mixture is then placed on the perforated false bottom 15 of the receptacle 10 as indicated at 21 and the cover 14 is secured in place. The gratings and sugar are then warmed by passing hot water through the coil 18 whereupon some of the sugar dissolves in some of the water contained in the cells of the gratings, and a syrup is formed which flows down through the mass and drops through the openings in the foraminous member 15 as indicated at 22. From time to time, this syrup which is accumulated in the bottom of the receptacle 10 below the foraminous member 15 may be drained off through the outlet pipe 12, sufficient of the syrup being retained at all times to provide a seal preventing escape of any vapors in the receptacle 10.

The heating may conveniently be carried out at a temperature of 175 to 195° F., and should be continued for an hour or more until the dripping of syrup from the foraminous member 15 has substantially ceased. The receptacle may then be allowed to cool naturally or may be artificially cooled by passing cold water through the coil 18, still maintaining the receptacle tightly closed. This cooling crystallizes the sugar remaining around the citrus fruit peel gratings, in situ, and forms a tight protective coating of sugar around the particles of dehydrated peel, preserving most of the essential oils in the gratings. This protective coating of sugar also serves to preserve the gratings by preventing their oxidation.

Instead of powdered sucrose, as mentioned above, finely divided sucrose and anhydrous dextrose or other similar materials may be employed to combine with and remove the water from the gratings. For example, corn syrup or the solids of corn syrup may be used in this manner.

This process is distinctly superior to previous efforts to produce candied fruit peel in which the slices of the peel have been boiled in water and/or dried in the open air, followed by coating of the dried or cooked peel with sugar. Gratings have more uses than slices of peel but since more of the essential oil is freed in grating the peel, heating of gratings in the open air is not feasible. Even heating the slices of peel prior to coating with sugar or heating in the open air eliminates 95% or more of the volatile oils from the peel which are essential in obtaining a natural flavor. By our process it is only necessary to heat the pasty mixture of sugar and gratings to a temperature sufficiently high to allow the syrup formed to drain freely out of the mass. In this manner, water is removed from the gratings without excessive loss of the very volatile essential oils and without subjecting the peel to objectionable high temperatures. When draining is completed, the sugar remaining with the gratings is in the form of a super-saturated solution which readily crystallizes as a coating over and around the gratings, preserving the flavoring ingredients therein from evaporation and oxidation.

The product of our invention exhibits good keeping qualities at room temperatures and provides a flavoring material for use in many food products. All but about 25% of the original moisture in the peel may be removed by the process of our invention while retaining more than twice the amount of essential oils retained in candied and/or dried citrus peel heretofore known.

By the term "peel" as used herein, we intend to include the outer covering of the citrus fruit with or without part or all of the albedo. While gratings of the peel have been referred to particularly, it will be apparent that this invention may be practiced to advantage for dehydrating larger particles of the peel.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A method of preparing dried citrus fruit peel comprising mixing the peel with sugar, warming said mixture in a closed receptacle, and allowing the syrup formed by the sugar and water from the peel to drain away from the mixture.

2. A method of drying citrus fruit peel comprising finely dividing said peel, mixing said finely divided peel with sugar, heating the mixture in a closed receptacle while allowing the sugar syrup formed to separate from the peel, and cooling said mixture in said closed receptacle to crystallize in situ the sugar remaining with said peel.

3. A method of drying citrus fruit peel comprising finely dividing said peel, mixing said finely divided peel with about 2 to 4 parts of substantially dry sugar by weight, heating the mixture in a closed receptacle, and draining sugar syrup away from said mixture.

4. A method of preparing dehydrated citrus fruit peel comprising removing the peel from said fruit in the form of gratings, mixing said gratings with dry sugar, supporting said mixture on a foraminous member in a closed receptacle, and heating said mixture for a sufficient time to permit syrup formed by the sugar to drain away from the mixture.

5. A method of preparing dehydrated citrus fruit peel comprising removing the peel from said fruit in the form of gratings, mixing said gratings with about three parts by weight of sugar, heating the mixture in a closed receptacle sufficiently long for syrup formed by said sugar and water from the peel to drain, cooling said drained mixture to crystallize the sugar remaining with said gratings, and thereafter opening said receptacle and removing the prepared gratings.

6. A method of drying citrus fruit peel comprising mixing the peel with sugar to liberate water from the peel and form a syrup, and separating water from the mixture in a closed receptacle by removing the water in fluid form to a remote portion of the receptacle while retaining in the mixture at least 10% of the volatile essential oils originally in the peel.

WASHINGTON PLATT.
PHILIP D. KRATZ.